Patented Oct. 20, 1953

2,656,268

UNITED STATES PATENT OFFICE 2,656,268

METHOD OF RECOVERING CALCIUM FROM A MIXTURE OF CALCIUM HYDRIDE AND MAGNESIUM OXIDE

Peter P. Alexander, Beverly, Mass.

No Drawing. Application June 21, 1950,
Serial No. 169,515

7 Claims. (Cl. 75—135)

My invention relates to a method for treating a mechanically inseparable mixture of calcium hydride and magnesium oxide to recover the calcium either in the form of calcium hydride or calcium metal or in other form useful in the chemical and metallurgical arts.

In my prior Patent No. 2,082,134, dated June 1, 1937, a method is described for the production of calcium hydride by reducing calcium oxide with magnesium in the presence of hydrogen. The reaction may be represented by the equation:

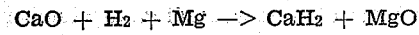
$$CaO + H_2 + Mg \rightarrow CaH_2 + MgO$$

The reaction product is a mechanically inseparable mixture of calcium hydride and magnesium oxide. It was used extensively by the armed forces during the recent world war for generation of hydrogen by reaction with water.

Since calcium oxide, magnesium and hydrogen are all low cost materials, the reduction of calcium oxide as above described provides an extremely low cost method for producing calcium hydride which is a very useful reagent in the chemical and metallurgical arts. However, the above reaction product contains an equimolecular proportion of magnesium oxide which renders the product objectionable for many such uses. No method has been known for separating the calcium hydride from the magnesium oxide either by chemical or mechanical means. The composition appears to be a molecular dispersion of calcium hydride in a matrix of magnesium oxide. Attempts by highly skilled investigators to separate the calcium hydride by mechanical means have resulted in complete failure. Prior to the present invention there was no known solvent suitable for this purpose. All known solvents for magnesium oxide decompose the calcium hydride and convert it to another undesired calcium compound.

The present invention is based upon the discovery that the calcium content of the mechanically inseparable mixture of calcium hydride and magnesium oxide can be recovered in a form highly useful in the chemical and metallurgical arts by heating the mechanically inseparable mixture with suitable materials in an inert medium at a temperature below that at which calcium hydride would normally begin to dissociate under the same pressure conditions. Suitable materials for this purpose are materials which form an alloy with calcium having a melting temperature below that at which calcium hydride would normally begin to dissociate under the pressure conditions employed. The product obtained is a mixture of magnesium oxide and a low melting metallic mass. The metallic mass may be separated from the magnesium oxide by heating the product at a temperature not greater than about 1000° C. to melt the metallic mass whereby the magnesium oxide separates in a separate layer which may be separated easily from the molten metallic mass. A suitable flux, such as calcium chloride, may be added to provide a fluid layer containing the magnesium oxide.

As illustrative of the materials which may be employed in the practice of the invention, I may mention copper, zinc, sodium, tin, cadmium, magnesium, etc.; the eutectic alloys of these metals with calcium; other alloys of such metals with calcium or two or more of such metals with or without calcium and which are capable of forming an alloy with calcium having a melting temperature below that at which calcium hydride would normally begin to dissociate under the pressure conditions employed.

The reaction may be conducted under vacuum or in the presence of hydrogen or an inert monatomic gas, such as argon. The maximum temperature which may be used depends upon the pressure conditions prevailing in the reaction zone. Thus, if the heating is conducted in an atmosphere of hydrogen or a monatomic gas at atmospheric pressure, the temperature used should not exceed about 800° C. but if a higher or lower pressure is used, a correspondingly higher or lower temperature respectively may be used. The reaction starts at the melting temperature of the eutectic alloy of calcium and the added material, such as copper, zinc, etc.

In accordance with one practice, a charge consisting of a mechanically inseparable mixture of calcium hydride and magnesium oxide in finely divided form and intimately mixed with a finely divided material, such as copper, is confined in the reaction zone of any suitable furnace. The charge is heated to a temperature between 100° C. and 200° C. while the reaction zone is evacuated to remove air and moisture. The vacuum then is disconnected and hydrogen introduced to maintain a pressure slightly greater than atmospheric pressure to prevent leakage of air into the reaction zone. The temperature of the charge is then raised to between the melting temperature of the eutectic alloy of calcium and the added material, such as copper, and a temperature of about 800°. The heating is continued until the reaction is complete which usually requires only a few minutes. The charge then is permitted to cool, preferably in the presence of an inert medium, until it can be removed from the furnace. In some instances it is desirable to agitate the charge, as by stirring, in order to maintain the mechanically inseparable mixture of calcium hydride and magnesium oxide in intimate contact with the added material, such as copper.

The amount of added material required will vary with the added material selected for use. I have obtained substantially complete recovery of all the calcium content from the mechanically inseparable mixture of calcium hydride and magnesium oxide using an amount of added material, such as copper, equal to the amount theoretically required to absorb the amount of calcium in the mechanically inseparable mixture and form a calcium containing alloy having a melting temperature not greater than the temperature at which calcium hydride begins to dissociate under the pressure conditions employed. It is preferable, however, to employ a substantially greater amount of the added material since this provides a larger volume of the metallic component of the final reaction product and facilitates the separation of the magnesium oxide. The amount of added material should not exceed that amount which theoretically can absorb the amount of calcium in the mechanically inseparable mixture to form an alloy having a melting temperature not greater than about 1000° C. and, preferably, not greater than about 800° C.

The reaction product obtained is a mixture of magnesium oxide and a metallic mass which may be separated easily as previously described. The metallic mass contains substantially all the calcium contained in the original mechanically inseparable mixture of calcium hydride and magnesium oxide. This metallic mass is composed essentially of calcium and the added material, such as copper, and contains some hydrogen. It appears to be an alloy of hydrogen, calcium and the added material but it may be a solution of calcium hydride in a low melting alloy of calcium and the added material. For cenvenience, it will be termed herein a calcium containing alloy.

When separated from the magnesium oxide, the component metals of the calcium containing alloy may be separately recovered. For example, since the boiling point of copper is much higher than that of calcium, the calcium containing copper alloy may be heated to a temperature slightly above the boiling point of calcium to distil out calcium and the vapor may be condensed to recover pure calcium metal or this metal may be hydrided and recovered as calcium hydride. It is not necessary to remove all calcium from the calcium containing alloy since the residue from the distillation may be reused for recovering calcium from the mechanically inseparable mixture of calcium hydride and magnesium oxide. In the case of the calcium containing sodium alloy, the sodium may be dissolved out with alcohol.

The present invention makes possible the production and recovery of calcium metal in substantially chemically pure form. The calcium containing alloy obtained after separation of the magnesium oxide contains the relatively small amount of metallic impurities, such as iron, zinc, magnesium, lithium, etc., which were present in the mechanically inseparable mixture of calcium hydride and magnesium oxide. When the calcium containing alloy is essentially calcium and another metal having a higher boiling temperature, such as copper, a large portion of the calcium content can be distilled off without removing appreciable amounts of the metal impurities contained in the alloy. The distilled calcium can be condensed and recovered in substantially pure form, most of the impurities remaining in the residue together with a substantial amount of calcium. This residue may be reused for removing the calcium content of the mechanically inseparable mixture as previously described.

I prefer to stop the distillation when the calcium content of the calcium containing alloy has been reduced to that of the eutectic alloy because the eutectic alloy is particularly suitable for reuse for reacting with the mechanically inseparable mixture of calcium hydride and magnesium oxide. As the calcium content is reduced below this amount increased amounts of metal impurities are removed and contaminate the distilled calcium.

I claim:

1. The method of treating a mechanically inseparable mixture of calcium hydride and magnesium oxide obtained by reducing calcium oxide with magnesium which comprises bringing said mechanically inseparable mixture into intimate contact with a metal capable of forming an alloy with calcium having a melting temperature below that at which calcium hydride normally begins to dissociate under the same pressure conditions, and heating said mechanically inseparable mixture while in intimate contact with said metal in the presence of an inert medium to a temperature above the melting temperature of the eutectic of said alloy but below the temperature at which calcium hydride normally begins to dissociate under the same pressure conditions thereby producing a metallic mass containing magnesium oxide and from which the magnesium oxide is mechanically separable.

2. The method of treating a mechanically inseparable mixture of calcium hydride and magnesium oxide obtained by reducing calcium oxide with magnesium which comprises bringing said mechanically inseparable mixture into intimate contact with a metal capable of forming an alloy with calcium having a melting temperature below that at which calcium hydride normally begins to dissociate under the same pressure conditions, heating said mechanically inseparable mixture while in intimate contact with said metal in the presence of an inert medium to a temperature above the melting temperature of the eutectic of said alloy but below the temperature at which calcium hydride normally begins to dissociate under the same pressure conditions thereby producing a metallic mass containing magnesium oxide and from which the magnesium oxide is mechanically separable, and separating said metallic mass from said oxide.

3. The method of treating a mechanically inseparable mixture of calcium hydride and magnesium oxide obtained by reducing calcium oxide with magnesium which comprises bringing said mechanically inseparable mixture into intimate contact with a metal comprising essentially copper and capable of forming an alloy with calcium having a melting temperature below that at which calcium hydride normally begins to dissociate under the same pressure conditions, and heating said mechanically inseparable mixture while in intimate contact with said metal in the presence of an inert medium to a temperature above the melting temperature of the eutectic of said alloy but below the temperature at which calcium hydride normally begins to dissociate under the same pressure conditions thereby producing a metallic mass containing magnesium oxide and from which the magnesium oxide is mechanically separable.

4. The method of treating a mechanically inseparable mixture of calcium hydride and magnesium oxide obtained by reducing calcium oxide with magnesium which comprises bringing said mechanically inseparable mixture into intimate contact with a metal comprising essentially sodium and capable of forming an alloy with calcium having a melting temperature below that at which calcium hydride normally begins to dissociate under the same pressure conditions, and heating said mechanically inseparable mixture while in intimate contact with said metal in the presence of an inert medium to a temperature above the melting temperature of the eutectic of said alloy but below the temperature at which calcium hydride normally begins to dissociate under the same pressure conditions thereby producing a metallic mass containing magnesium oxide and from which the magnesium oxide is mechanically separable.

5. The method of treating a mechanically inseparable mixture of calcium hydride and magnesium oxide obtained by reducing calcium oxide with magnesium which comprises bringing said mechanically inseparable mixture into intimate contact with a metal comprising essentially zinc and capable of forming an alloy with calcium having a melting temperature below that at which calcium hydride normally begins to dissociate under the same pressure conditions, and heating said mechanically inseparable mixture while in intimate contact with said metal in the presence of an inert medium to a temperature above the melting temperature of the eutectic of said alloy but below the temperature at which calcium hydride normally begins to dissociate under the same pressure conditions thereby producing a metallic mass containing magnesium oxide and from which the magnesium oxide is mechanically separable.

6. The method of treating a mechanically inseparable mixture of calcium hydride and magnesium oxide obtained by reducing calcium oxide with magnesium which comprises bringing said mechanically inseparable mixture into intimate contact with a metal comprising essentially magnesium and capable of forming an alloy with calcium having a melting temperature below that at which calcium hydride normally begins to dissociate under the same pressure conditions, and heating said mechanically inseparable mixture while in intimate contact with said metal in the presence of an inert medium to a temperature above the melting temperature of the eutectic of said alloy but below the temperature at which calcium hydride normally begins to dissociate under the same pressure conditions thereby producing a metallic mass containing magnesium oxide and from which the magnesium oxide is mechanically separable.

7. The method of claim 1 in which the metal capable of forming an alloy with calcium is the eutectic alloy of calcium and copper.

PETER P. ALEXANDER.

References Cited in the file of this patent

UNITED STATES PATENTS

| Number | Name | Date |
|---|---|---|
| 1,169,392 | Frary | Jan. 25, 1916 |
| 1,563,188 | Harvey | Nov. 24, 1925 |
| 1,935,245 | Kirsebom | Nov. 14, 1933 |
| 2,082,134 | Alexander | June 1, 1937 |
| 2,254,976 | Powell | Sept. 2, 1941 |

FOREIGN PATENTS

| Number | Country | Date |
|---|---|---|
| 395,989 | Great Britain | July 27, 1933 |

OTHER REFERENCES

"Chemical Abstracts" vol. 2 (1908), page 3037.
"Aufbau der Zweistofflegierungen," by Hansen, photolithoprint by Edward Bros., Inc., Ann Arbor, Mich., 1943, page 395.